(12) United States Patent
Kelly et al.

(10) Patent No.: US 7,702,861 B2
(45) Date of Patent: Apr. 20, 2010

(54) FORMAT MAPPING SCHEME FOR UNIVERSAL DRIVE DEVICE

(75) Inventors: Declan Patrick Kelly, Eindhoven (NL); Wilhelmus Franciscus Johannes Fontijn, Eindhoven (NL); Wilhelmus Jacobus Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 533 days.

(21) Appl. No.: 10/552,815

(22) PCT Filed: Apr. 5, 2004

(86) PCT No.: PCT/IB2004/050398

§ 371 (c)(1), (2), (4) Date: Oct. 11, 2005

(87) PCT Pub. No.: WO2004/090889

PCT Pub. Date: Oct. 21, 2004

(65) Prior Publication Data

US 2006/0087957 A1    Apr. 27, 2006

(30) Foreign Application Priority Data

Apr. 14, 2003  (EP)  ................... 03101006

(51) Int. Cl.
| G06F 13/00 | (2006.01) |
| G06F 13/28 | (2006.01) |
| G06F 12/00 | (2006.01) |
| G06F 17/30 | (2006.01) |
| G06F 13/12 | (2006.01) |
| G06F 13/38 | (2006.01) |

(52) U.S. Cl. .................. 711/154; 711/102; 707/205; 710/65

(58) Field of Classification Search .............. 711/154, 711/102; 707/205; 710/65
See application file for complete search history.

(56) References Cited

U.S. PATENT DOCUMENTS

| 6,377,500 | B1 * | 4/2002 | Fujimoto et al. | 365/230.01 |
| 6,377,958 | B1 * | 4/2002 | Orcutt | 707/200 |
| 6,564,228 | B1 * | 5/2003 | O'Connor | 707/200 |
| 2002/0065810 | A1 * | 5/2002 | Bradley | 707/2 |
| 2003/0026186 | A1 * | 2/2003 | Ando et al. | 369/53.24 |
| 2004/0181388 | A1 * | 9/2004 | Yip et al. | 703/25 |

OTHER PUBLICATIONS

MRAM (http://en.wikipedia.org/wiki/MRAM).*
Universal Disk Format (http://www.absoluteastronomy.com/topics/Universal_Disk_Format).*
EXT3 Journaled File System, Feb. 2002, LXF25.tut_et3.pdf, XP002283999.

(Continued)

Primary Examiner—Matt Kim
Assistant Examiner—Edward J Dudek

(57) ABSTRACT

A drive device and method of reading from or writing to a record carrier are provided, where data is input or output via an interface using a first format according to a first file system. In the drive device, the first format is mapped to a second format according to a second file system used on the record carrier. This allows using different storage technology with the same interface, such as using a hard-disc based Microdrive with a Compact Flash interface.

19 Claims, 2 Drawing Sheets

OTHER PUBLICATIONS

Dosemu Technical Guide, Mar. 2002, URL:http: //dosemu.sourceforge.net.docs/REA,, XP002284000.

Sofeware Architects Inc: White Paper: The Universal Disk Format UDF, Aug. 1998, XP002183534.

Roy Duncan: High Performance File System, Sep. 1989, XP002284001.

ISR for Publication, International Publication No. W02004/090889.

* cited by examiner

FORMAT MAPPING SCHEME FOR UNIVERSAL DRIVE DEVICE

The present invention relates to a drive device and method of reading from or writing to a record carrier, such as an optical disc. In particular, the invention relates to format mapping from a standard drive interface to an optical disc format.

The applicant has recently developed a miniature optical disc that records, plays back and erases data using the same precision blue lasers that are being developed for the next generation of high-definition video recorders. A system of the miniature optical disc is known as SFFO (Small Form Factor Optical) or Portable Blue (PB) and shows that it is possible to store 4 Gigabytes on a 3-cm-disc, and to make a drive device that can read it reliably as small as a memory card. The SFFO or PB disc will have a well-defined logical format according to a standard file system, such as UDF. However, host devices or data sources may not understand this format and so they may write data in a way that is not compliant to the SSFO or PB disc format. Moreover, optical discs have limited number of rewrites, e.g. 1000. A host device that is not aware of using an optical disc may constantly write to the same location, e.g. with the file system data, resulting in a failure of that part of the disc. This may result in the complete disc being unusable if the location of the failure includes critical data such as the file system.

Currently, there are a number of standard interfaces for connecting storage devices to hosts such as personal computers (PCs) or digital cameras. Possible interfaces include PCMCIA (Personal Computer Memory Card International Association), Compact Flash, MMCA (Multi Media Card Association) etc. It is possible to use different storage technologies in conjunction with the same interface, for example, the hard-disc based Microdrive has a Compact Flash (CF) interface. These standard interfaces provide physical compatibility but the logical format on the device is not covered by the standard. Therefore, although the host may be able to interface with the storage device, there is no guarantee that it can understand the way data is stored on the storage device. The storage device presents itself to the host as a logical address space.

Due to the fact that the SFFO or PB disc will be approximately 30 mm in diameter, the drive device can fit the Compact Flash form factor. In this case, it is possible to create a removable drive with an interface typically used for solid state memories, e.g. the CF interface. However, replacing solid state memory raises the following problems specific to optical disc and in particular to SFFO or PB:

1. The SFFO or PB disc will have a well-defined logical format including a file system, e.g. UDF (Universal Disc Format) as specified in the UDF specification Revision 2.01 by Optical Storage Technology Association (OSTA) dated 3 Apr. 1998 or a later version. Legacy host devices will not understand this format and will most probably write data in a way that is not compliant to the SFFO or PB disc format, e.g. using the common File Allocation Table (FAT) file system. This may result in discs that are not readily exchangeable with other SFFO or PB players. Further details concerning the FAT file system can be gathered from the Internet address http://www.microsoft.com/windows2000/techinfo/reskit/en-us/default.asp?url=/windows2000/techinfo/reskit/en-us/core/fncc_fil_weol.asp.
2. As already mentioned above, optical discs have a limited number of rewrites available, e.g. 1000. A host device which is not aware that it is using an optical disc may write constantly to the same location, e.g. with the file system data, resulting in a failure of that part of the disc. This may result in the complete disc being unusable if the location of the failure includes critical data such as the file system. Coping with the limited recyclability is a common problem for solid state memories, such as Flash memories, but the solutions formulated for these are not applicable to SFFO or PB discs.
3. The performance of SFFO or PB with regard to seek times and sustained data rate differs from hard disc drives (HDD), e.g. the Microdrive, and solid state memories. Legacy hosts will not be aware of this difference and may write the SFFO or PB in a way that is not optimal to achieve the required performance.
4. The power consumption of mechanical drives such as the Microdrive and SFFO or PB exceed that of solid state memories by orders of magnitude. To bridge the gap, advanced power management is required. Legacy hosts will not be aware of such provisions and the access pattern of such hosts will typically not be optimal with regard to power consumption.
5. The SFFO or PB is a removable format. As a result, the medium is more prone to macroscopic defects, such as spots and scratches. The SFFO or PB format may include measures to cope with this issue. Again, legacy hosts will be unaware of these measures.

As a specific example, an SFFO or PB drive could be connected via a Compact Flash (CF) interface to a digital camera. The camera will store pictures using the FAT file system through the CF interface. This would result in FAT on SFFO or PB instead of the SFFO or PB file system, e.g. UDF. Also, the camera is likely to write the FAT file system each time at the same location, which will result eventually in a failure at that location and consequently a failure of the complete disc.

Existing devices such as Memory Stick and Compact Flash have a controller which may do some remapping between the logical address space and physical address space to deal with hot spots. However, unlike Flash Memories, there is an additional problem for optical discs due to their seek time, such that arbitrary remapping on an optical disc may result in performance problems.

It is therefore an object of the present invention to provide a method and drive device for enabling the use of a standard drive interface in connection with a record carrier format, e.g. an optical disc format.

This object is achieved by a drive device as claimed in claim 1 and by a reading or writing method as claimed in claim 23.

Accordingly, a mechanism is provided to map from a legacy format, e.g. based on the FAT file system, to a new record carrier format, e.g. SFFO or PB format based on UDF. The properties of the record carrier format are thus hidden from interfaces typically used for solid state storage.

In connection with the present invention, the term "legacy" is used to indicate those formats, applications, data or devices, which have been inherited from languages, platforms, and techniques earlier than the current technology. Typically, the challenge is to keep the legacy features or applications running while converting it to newer, more efficient features that make use of new technology and skills.

The interface means may be a standard interface for storage devices, such as PCMCIA, Compact Flash, or MMCA.

Furthermore, the first file system may be a FAT file system, and the second file system may be a UDF file system. Thereby, a general or universal use of the drive device can be guaranteed, e.g. to replace conventional removable drive devices by the new disc drive device.

The mapping means may be adapted to reserve space for an image of the first file system in the logical specification of the second format. In particular, the mapping means may be arranged to treat the reserved space as a partition of the first file system. Furthermore, the mapping means may be arranged to apply a defect management to the reserved space. The image of the first file system may correspond to a single file. This image-based implementation provides an easy solution at the expense of exchangeability, which may be acceptable in some cases.

The device may provide access to files of the second file system via the interface means by hosts which do not know the second file system. Then, the second file system may be interpreted by the mapping means which is arranged to write equivalent structures of the first file system to the record carrier. The mapping means may be adapted to convert a file of the first file system into clusters of a predetermined size which corresponds to a packet size of the second file system, and to align the clusters with packets of the second file system. Thereby, protection is given against performance loss in case of relatively large files.

The image of the first file system may be split by the mapping means into different categories based on properties of data structures, and to store the split file components in different files of the second file system. This offers the opportunity to keep all file system data close together and prevent early loss of performance as a consequence of remapping of sectors containing frequently accessed data. The different categories may comprise at least one of a robust allocation class and a volatile allocation class for file structures.

As a second implementation, the mapping means may be arranged to mount the second file system on a record carrier and translate the second file system in a memory means into equivalent structures of the first file system. Hence, effectively, a different file system is cached in the memory means. In particular, the memory means may be a non-volatile memory. Then, the updating of the second file system can be delayed by the device until the record carrier is ejected.

The mapping means may be arranged to store static data structures of the first file system in a file on the record carrier and volatile data structures of the first file system in the memory means. Thereby, a combination between the image-based implementation and the memory-based implementation is provided. The static parts of the first file system are then stored in a file, and the volatile parts of the first file system are generated in memory if required. This reduces time and processing needed to reconstruct the first file system.

As a further implementation, the mapping means may be arranged to provide a dynamic mapping between data structures of the first file system and data structures of the second file system. This on-the-fly translation between the file systems provides the benefit that the system can take full advantage of all provisions in the logical format specification of the second file system.

Further advantageous modifications are defined in the dependent claims.

The present invention will now be described on the basis of preferred embodiments with reference to the accompanying drawings, in which.

The preferred embodiments will now be described in connection with a removable SFFO or PB drive device which exposes a FAT based CF interface to legacy hosts such as digital cameras.

Every storage device needs a file system so that the data can be stored and retrieved as files. To access any file, the operating system (OS) needs to know where that file is. For convenience, all files are given a distinguishing name and are assigned to one of a number of hierarchically organized directories. Files also may have associated attributes, e.g. to define read and write permissions. A file system facilitates the storage and retrieval of perhaps many hundreds or even thousands of files. Different OS classes often use different File Systems and a number of file systems are in use to suit multiple platforms. The most common file system for CD-ROM is ISO 9660 which is the international standard version of the High Sierra Group file system and is designed for personal computers.

With the advent of the Digital Versatile Disc (DVD), the UDF file system has been added to the list. This is suitable for read-only, re-writable (RW) and recordable or write-once (R) discs and allows long file names. CD media require special consideration due to their nature. CD was originally designed for read-only applications which affects the way in which it is written. RW formatting consists of writing a lead-in, user data area, and lead-out. These areas may be written in any order. The physical format may be followed by a verification pass. Defects found during the verification pass are enumerated in a non-allocatable space list Free space descriptors can be recorded and reflect space allocated to defective areas and sector sparing areas. The format may include all available space on the medium. However, if requested by the user, a subset may be formatted to save formatting time. That smaller format may be later grown to the full available space.

In the following preferred embodiments, UDF is used as the SFFO or PB file system.

Figure 1:
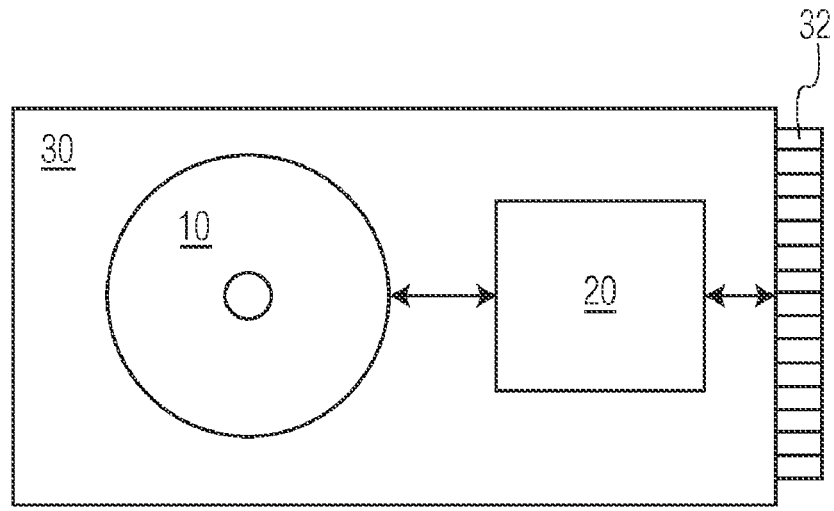
FIG. 1 shows a schematic block diagram of a removable drive device with a standard interface, according to the preferred embodiments of the present invention.

FIG. 1 shows a removable drive device 30 adapted to fit the Compact Flash form factor. Hence, the drive device 30 can be used to replace solid state memories. To achieve this, a standard CF interface 32 with corresponding connection terminals is provided, to which a mapping unit 20 is connected. Due to the fact that the CF interface 32 is commonly used in connection with a FAT file system, the mapping unit 20 must be arranged to map from FAT to UDF when writing to the disc 10 of the removable drive device 30, and to map from UDF to FAT when reading from the disc 10.

FAT is the MS-DOS file system supported by most of today's operating systems. It comes in three different types, i.e. FAT 12, FAT 16 and FAT 32, wherein the names refer to the number of bits used by the entries in the file allocation table which gave the file system its name. The file allocation table is actually one of the structures inside the FAT file system as seen on-disc. The purpose of this table is to keep track of which areas of the disc are available and which areas are in use. In FAT, the data area is divided into clusters which correspond to group of sectors on the FAT media. The rest of the partition is simply divided into sectors. Files and directories store their data in these clusters. The size of one cluster is specified in a structure called the Boot Record and can range from a single sector to 128 sectors. The Boot Record is located within an area of reserved sectors. The actual file allocation table structure is a relatively simple structure. It is simply an array of 12-bit, 16-bit or 32-bit data elements.

The file allocation table can be regarded as a singly linked list. Each of the chains in the file allocation table specifies which parts of the disc belong to a given file or directory. The user data area is the area where the contents of the files and directories are stored. In FIG. 1, when a block is written through the interface 32, it is not known what file it belongs to, as, generally, the file system will only be updated after the data is written or at the end of a session. However, in practice it can be assumed that consecutive blocks belong to the same file and so allocation of these blocks can be done in order to conform to allocation rules in most cases. Then, it will be necessary to reflect any remapping in the file system when it is written. Using heuristic rules, it is possible in practice to adhere to predefined allocation rules.

Figure 2:
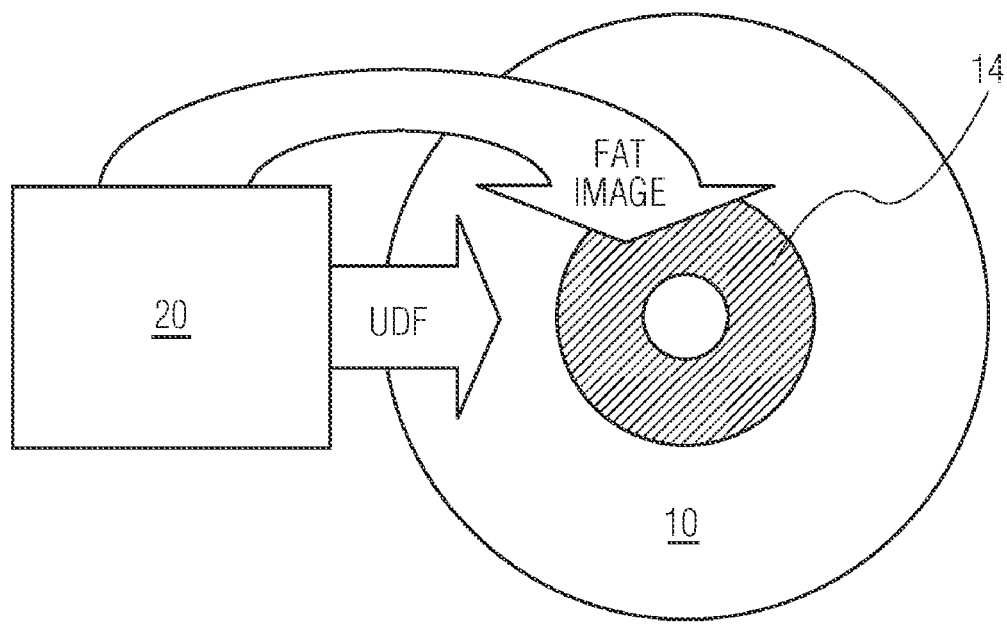
FIG. 2 shows a principal diagram indicating an image-based implementation according to the first preferred embodiment.

In the following preferred embodiments, properties of the SFFO or PB format are hidden from the interface 32 used for solid state storage. According to the specific implementations of the following first to third preferred embodiments, the SFFO or PB drive device 30 exposes a FAT based CF interface 32 to legacy hosts such as digital cameras. FIG. 2 shows a mapping implementation according to the first preferred embodiment, where space is reserved in the SFFO or PB logical format specification for a FAT image and defect management is applied to the reserved space 14 on the disc 10. The reserved space 14 will be treated as a FAT partition. In the UDF file system, this FAT image may appear as a single file. Hence, the image of the FAT file system is converted in the mapping unit 20 into a UDF file of the UDF file system used on the disc 10.

If the optical disc 10 with the FAT image is used in an SFFO or PB drive which does not expose a CF interface, the FAT entry describing the layout of files on the optical disc 10 can be mirrored in the UDF file system. Thus, two file systems are written for the same data. As an alternative, applications which want to write to or read from the FAT image provided in the reserved space 14 of the optical disc 10 may interpret the FAT structures themselves.

On the other hand, hosts which access files described in UDF across the CF interface 32 may not know the UDF file system. Thus, UDF files cannot be exposed across the FAT based CF interface 32. Files written by SFFO or PB drives that do not implement FAT are not visible to devices using the FAT based CF interface 32 to access the optical disc 10. In some cases, e.g. CF II cards in laptops, this may be considered not an ideal situation as it limits the exchangeability of files using SFFO or PB discs. In other cases, such as digital still cameras, this can be considered a benefit, as files that the camera does not understand are not visible to it As another option, the removable SFFO or PB drive 30 which exposes the FAT based CF interface 32 may interpret the complete UDF file system and write the equivalent FAT structures to the SFFO or PB disc 10. This interpretation function may be implemented in the mapping unit 20.

The issue of limited recyclability can be dealt with by the defect management provided by the drive. The SFFO or PB logical format layer can take care of this defect management. The defect management should be transparent to the host. FAT implementations demand the boot sector to be at LBN 0, which is the first sector in the address space inside the FAT image. The boot sector contains the BIOS Parameter Block BPB. If this sector is remapped it should appear to the host to be still at LBN 0. Furthermore, most FAT implementations expect the FS info structure at LBN 1 and may not be able to cope with another location. This structure is frequently updated and a likely candidate to run out of cycles for rewriting, and consequently a sector likely to be remapped at some time. Mapping may be based on a shift of the location of this structure on the disc 10 to thereby prevent deterioration of the disc properties.

The SFFO or PB logical format layer faces one big file. This has consequences with regard to performance, power consumption and robustness. When typically storing relatively large files, e.g. in case of a digital still camera as host device, some protection against dramatic performance loss can be acquired by choosing a cluster size of 32 K, i.e. one packet on the SFFO or PB disc 10, and ensuring that the clusters are aligned with SFFO or PB packets.

As an alternative, the FAT structures can be stored in more than one UDF file. In particular, the separation could be based on the volatility of the FAT structures. Static FAT structures could be stored as allocation class "robust", volatile FAT structures could be stored as allocation class "volatile", and the actual files could be stored using FAT in the reserved space 14. Thereby, a split FAT image is provided on the disc 10.

The use of allocation classes is useful in the present case where the storage medium or device has certain properties that limit the performance on a certain aspect.

It is noted that optimizations inside the reserved space 14 for the FAT file data, e.g. concentrating directory files, requires a control over the legacy host which is expected to access the FAT files.

The image-based implementation according to the first preferred embodiments thus provides an easy solution to the mapping problem, at the expense of exchangeability.

Figure 3:
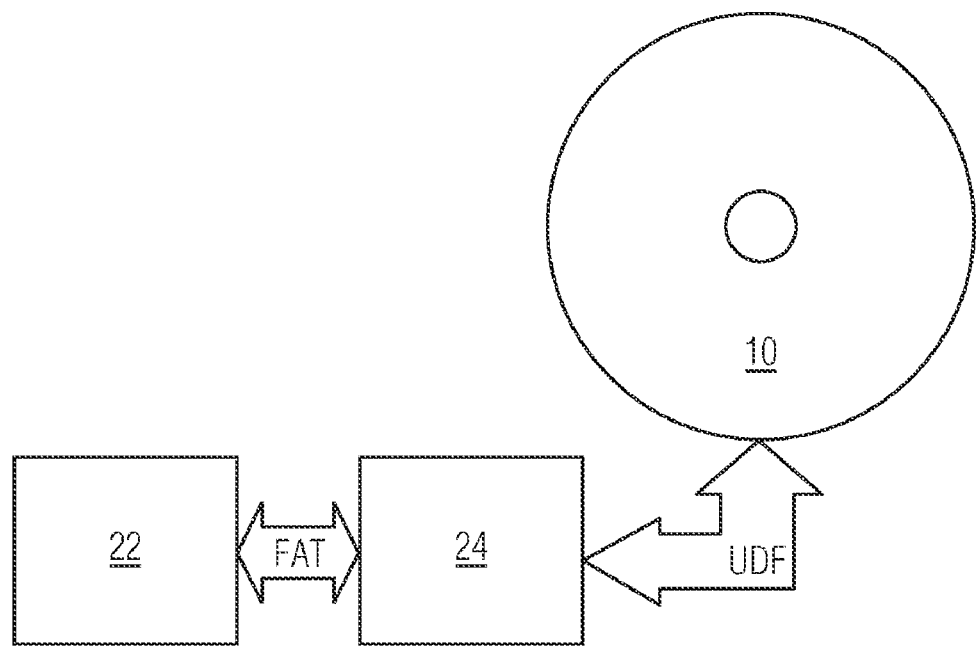
FIG. 3 shows a schematic diagram indicating a memory-based implementation according to the second preferred embodiment.

FIG. 3 shows a schematic diagram of a memory-based implementation according to the second preferred embodiment as an attractive way for the SFFO or PB drive device 30 to expose the FAT based CF interface 32 by mounting the UDF file system on the disc 10 and translating the UDF file system into equivalent FAT structures in a memory unit 24. The equivalent FAT structures are then exposed by an interface mapping unit 22 to the host device through the CF interface 32.

The memory unit 24 may be an NVRAM (Non-Volatile Random Access Memory). If an NVRAM is used in this case, the update of the UDF file system on the disc 10 can be delayed until the disc 10 is ejected. On the other hand, if a volatile RAM is used, this would make the system susceptible to inconsistencies in the UDF file system on the disc 10, as the file system data may be lost if the memory looses power. The NVRAM in the memory unit 24 may be an MRAM (Magneto-resistive Random Access Memory) in which data bits are stored using magnetic charges instead of electrical charges. Thus, the high speed of static RAM is combined with the high density of dynamic RAM to thereby store greater amounts of data, enabling it to be accessed faster while consuming less power than existing electronic memories. Furthermore, the MRAM retains data after the power supply is cut off, to thereby prevent data loss and enable instant start without waiting for any booting procedure. Thereby, FAT structures can be updated often and recyclability is not limited as in Flash memory devices. The interface mapping unit 22 is arranged to provide access to the memory unit 24 and to map the FAT data stored in the memory unit 24 to the format used at the CF interface 32. In the other preferred embodiments, this interface mapping functionality is also provided in the mapping unit 20.

Accordingly, in the memory based implementation according to the second preferred embodiment, effectively, a different file system is cached in the memory unit 24, then the one on the disc 10. However, a combination with the image based solution of the first preferred embodiment is possible. In particular, the static FAT structures, e.g. the boot record, can be stored in a file on the disc 10, while the volatile parts, e.g. file system information sector, FAT tables etc., are generated in the memory unit 24. This reduces the time and processing needed to reconstruct the FAT structures. Storing volatile FAT structures on the disc 10 would only be useful if a separate application or host does not update the UDF file system in the meantime, which usually cannot be guaranteed.

If the FAT structures are generated and maintained in the memory unit 24, the disc 10 will be shielded on the frequent updating of the FAT structures. Due to the fact that most volatile and frequently accessed FAT structures are thus cached in the memory unit 24, the performance and power consumption will be comparable to those in case of cached UDF file systems.

The memory based implementation according to the second preferred embodiment requires additional memory in the memory unit 24 of the drive device 30. With 32 KB clusters, i.e. packet alignment, and 16 bit entries, i.e. FAT 16, and 32768 clusters, i.e. 1 GB disc, this would require 32768*2=64 KB for the FAT table, if FAT is to cover the complete SFFO or PB disc. In case of 4 KB clusters and 32 bit entries, i.e. FAT 32, this would require 1 MB. On the other hand, not caching the PAT table would mean either caching the UDF file system or that for each read and/or write operation the disc 10 needs to be accessed to get the file allocation. This is very power consuming.

Figure 4:
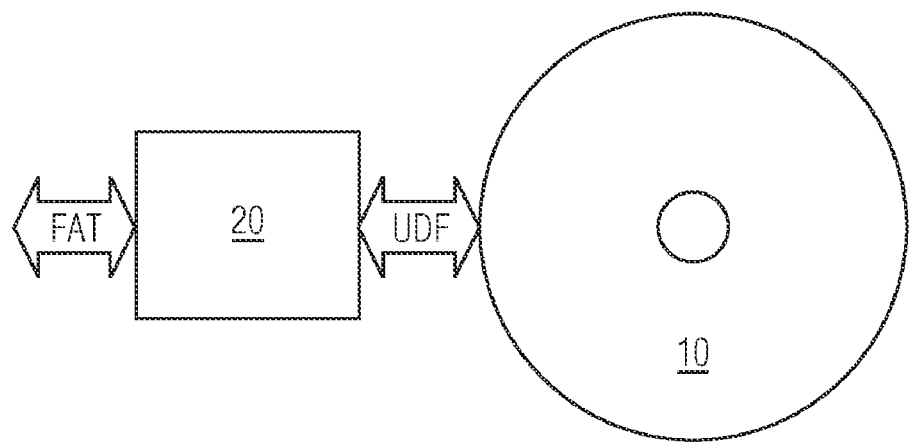
FIG. 4 shows a schematic diagram indicating a dynamically mapping implementation according to the third preferred embodiment.

FIG. 4 shows a dynamically mapping implementation according to the third preferred embodiment, wherein the FAT structures are dynamically mapped onto UDF structures and vice versa in a straight forward manner. Such an on-the-fly translation provides the benefit that the system can take full advantage of all provisions in the SFFO or PB logical format specification. In the third preferred embodiment, performance aspects are covered by specific allocation classes. The selection of an allocation class for a certain file could be based on heuristic rules, such as usage patterns of similar files or types of data sources. The CF interface 32 may be agnostic of such allocation classes. When typically storing relatively large files, e.g. in case of a digital still camera, some protection against dramatic performance loss can be acquired by choosing a cluster size of 32 K (i.e. one packet on the SFFO or PB disc 10).

With an average file size of 96 KB and a cluster size of 32 KB, 3*16 bit is needed to describe the allocation in case of FAT and at least (2 to 4)*16 bit are needed to describe the allocation in case of UDF. In case of large files, caching UDF and on-the-fly translation to FAT, according to the second and third embodiments, is advantageous at least in terms of memory space required.

The functions provided by the mapping unit 20 of the first to third embodiment and by the interface mapping unit 22 and memory unit 24 of the second embodiment may be implemented as discrete hardware elements or as software routines controlling a processing element, such as a signal processor or a micro processor, which form or belong to a control unit or controller of the drive device 30.

It is noted that the present application is not restricted to the above specific embodiments but can be used in any drive device having an interface using a first file system and a record carrier using a different second file system. Of course, the mapping implementations according to the first to third preferred embodiments may be used for mapping any combination of file systems. The preferred embodiments may thus vary within the scope of the attached claims.

The invention claimed is:

1. A drive device for a record carrier, said drive device comprising:
    interface means for providing a first format for inputting or outputting data according to a first file system; and
    mapping means for mapping said first format to a second format according to a second file system used on said record carrier; wherein said mapping means is adapted to reserve space on the record carrier for an image of said first file system in a logical specification of said second format, and wherein said mapping means is further adapted to split said image of said first file system into different categories based on properties of data structures, and to store said different categories in different files of said second file system;
    wherein said mapping means is further adapted to mount said second file system on said record carrier and to translate said second file system in a memory unit into equivalent structures of said first file system, and to store static data structures of said first file system in a file on said record carrier and volatile data structures of said first file system in said memory unit;
    wherein said mapping means is further adapted to shift a location of frequently updated data on said record carrier; and
    wherein an entry, describing a layout of files on the record carrier in the first file system, is logically mirrored in the second file system, so that two file systems are written for a same data.

2. The device according to claim 1, wherein said interface means is a standard interface for storage devices.

3. The device according to claim 2, wherein said standard interface is a PCMCIA, Compact Flash, or MMCA interface.

4. The device according to claim 1, wherein said first file system is a FAT file system.

5. The device according to claim 1, wherein said record carrier is an optical disc.

6. The device according to claim 1, wherein said drive device is a removable drive device.

7. The device according to claim 1, wherein said image of said first file system corresponds to a single file of said second file system.

8. The device according to claim 1, wherein said device provides access to files of said second file system via said interface means by hosts which do not know said second file system.

9. The device according to claim 8, wherein said second file system is interpreted by said mapping means which is arranged to write equivalent structures of said first file system to said record carrier.

10. The device according to claim 1, wherein said different categories comprise at least one of a robust allocation class and a volatile allocation class for file structures.

11. The device according to claim 1, wherein said memory unit is a non-volatile memory.

12. The device according to claim 11, wherein said second file system is updated by said device when said record carrier is ejected.

13. The device according to claim 11, wherein said non-volatile memory is an MRAM.

14. The device according to claim 1, wherein said mapping means is arranged to provide a dynamic mapping between data structures of said first file system and data structures of said second file system.

15. The device of claim 1, wherein said mapping means is arranged to treat said reserved space as a partition of said first file system.

16. A drive device for a record carrier, said drive device comprising:
- interface means for providing a first format for inputting or outputting data according to a first file system; and
- mapping means for mapping said first format to a second format according to a second file system used on said record carrier;
- wherein said mapping means is adapted to reserve space on the record carrier for an image of said first file system in a logical specification of said second format, and wherein said mapping means is further adapted to split said image of said first file system into different categories based on properties of data structures, and to store said different categories in different files of said second file system, wherein said second file system is a UDF file system,
- wherein said mapping means is further adapted to mount said second file system on said record carrier and to translate said second file system in a memory unit into equivalent structures of said first file system, and to store static data structures of said first file system in a file on said record carrier and volatile data structures of said first file system in said memory unit;
- wherein said mapping means is further adapted to shift a location of frequently updated data on said record carrier; and
- wherein an entry, describing a layout of files on the record carrier in the first file system, is logically mirrored in the second file system, so that two file systems are written for a same data.

17. A drive device for a record carrier, said drive device comprising:
- interface means for providing a first format for inputting or outputting data according to a first file system; and
- mapping means for mapping said first format to a second format according to a second file system used on said record carrier; wherein said mapping means is adapted to reserve space on the record carrier for an image of said first file system in a logical specification of said second format, and wherein said mapping means is further adapted to split said image of said first file system into different categories based on properties of data structures, and to store said different categories in different files of said second file system, wherein said mapping means is arranged to apply a defect management to said reserved space,
- wherein said mapping means is further adapted to mount said second file system on said record carrier and to translate said second file system in a memory unit into equivalent structures of said first file system, and to store static data structures of said first file system in a file on said record carrier and volatile data structures of said first file system in said memory unit;
- wherein said mapping means is further adapted to shift a location of frequently updated data on said record carrier; and
- wherein an entry, describing a layout of files on the record carrier in the first file system, is logically mirrored in the second file system, so that two file systems are written for a same data.

18. A drive device for a record carrier, said drive device comprising:
- interface means for providing a first format for inputting or outputting data according to a first file system; and
- mapping means for mapping said first format to a second format according to a second file system used on said record carrier; wherein said mapping means is adapted to reserve space on the record carrier for an image of said first file system in a logical specification of said second format, and wherein said mapping means is further adapted to split said image of said first file system into different categories based on properties of data structures, and to store said different categories in different files of said second file system, wherein said mapping means is adapted to convert a file of said first file system into clusters of a predetermined size which corresponds to a packet size of said second file system, and to align said clusters with packets of said second file system,
- wherein said mapping means is further adapted to mount said second file system on said record carrier and to translate said second file system in a memory unit into equivalent structures of said first file system, and to store static data structures of said first file system in a file on said record carrier and volatile data structures of said first file system in said memory unit;
- wherein said mapping means is further adapted to shift a location of frequently updated data on said record carrier; and
- wherein an entry, describing a layout of files on the record carrier in the first file system, is logically mirrored in the second file system, so that two file systems are written for a same data.

19. A method of reading from or writing to a record carrier, said method comprising the steps of:
- outputting or inputting data using a first format according to a first file system;
- mapping said first format to a second format according to a second file system used on said record carrier;
- reserving space on the record carrier for an image of said first file system in a logical specification of said second format;
- splitting said image of said first file system into different categories based on properties of data structures; and
- storing said different categories in different files of said second file system, wherein the mapping step is arranged to treat said reserved space as a partition of said first file system;
- wherein said mapping step includes the steps of:
- mounting said second file system on said record carrier and to translate said second file system in a memory unit into equivalent structures of said first file system;
- storing static data structures of said first file system in a file on said record carrier and volatile data structures of said first file system in said memory unit;
- shifting a location of frequently updated data on said record carrier; and
- logically mirroring an entry, describing a layout of files on the record carrier in the first file system, in the second file system, so that two file systems are written for a same data.

* * * * *